Patented Sept. 29, 1925.

1,555,615

UNITED STATES PATENT OFFICE.

FRIEDRICH W. WEBER, OF HACKENSACK, NEW JERSEY.

PROCESS FOR EXTRACTING SILVER.

No Drawing. Application filed October 13, 1924. Serial No. 743,494.

*To all whom it may concern:*

Be it known that I, FRIEDRICH WILHELM WEBER, a citizen of the Republic of Germany, and a resident of Hackensack, county of Bergen, State of New Jersey, have invented certain new and useful Improvements in Processes for Extracting Silver, of which the following is a specification.

This process relates to the extraction of silver and it particularly relates to the extraction of silver from ores, the object of the invention being to extract the silver from the ores in a greater state of purity and at a greater yield than was heretofore possible.

It is also an object of the invention to extend the application of the process to all grades of silver ore, either high or low grade, and it is another object of the invention to render the process of extracting more expeditious and cheaper by recovering the various solutions applied in leaching the metals from the ores and by recovering the chemicals, used in the further course of the process, in the form of valuable by-products.

There are immense quantities of low grade silver ores in all mining countries of the world which cannot be utilized for the extraction of silver because there was no process economical enough to warrant the expense of moving the great mass of material through the process for in view of the quantities of recovered silver these processes caused unduly great losses from the mere handling of the material and in the precipitation work.

It is especially in the latter part where tremendous losses are sustained. The zinc used for the precipitation of the silver displaces the same in solution according to the following equation,

while the lead with which the zinc shavings are coated, to form a galvanic couple, remains unchanged. The zinc is, however, also dissolved directly by the cyanide solution, caustic soda being formed and hydrogen set free.

In cleaning up, the shavings are washed and filtered in order to separate the residue of zinc and soluble salts, and the sludge is charged into a large tub with dilute sulphuric acid or bisulfate of sodium. Finely divided zinc is dissolved and the cyanide decomposed with violent frothing owing to the disengagement of gas. The obtained slimes are then worked up to be finely fused with fluxes in graphite crucibles, which I will not further dwell upon inasmuch as it is of prime importance, in order to arrive at the merits of my invention in comparison with the processes of the prior art, to point out the great sources of losses which, by the way, also entail a terrible danger to human life for the great quantities of hydrocyanic acid developed by the decomposition of the cyanides. I want to mention also that this precipitation process introduces a lot of impurities which later on contaminate the obtained silver.

In contradistinction to this precipitation process my new invention offers a process in which all the applied solutions are of alkaline reaction throughout the whole process and therefore are easily handled mechanically and do not offer the possibility of danger to the working men from escaping gas and as all the solutions applied during the process are of great purity it stands to reason that the obtained silver must be practically pure. This advantage offered by my new invention is not found in some new processes by which the silver values are precipitated from cyanide solutions by means of an alkali metal amalgam, in which processes a great quantity of mercury is provided in the precipitation tank, the mercury absorbing the silver which is finally obtained by distilling off the mercury so that all impurities present in the mercury, for instance metallic tin, are ultimately found in the silver, these impurities tarnishing the silver so thoroughly that it is impossible to obtain a silver displaying a pure metallic luster.

I have endeavored to avoid such losses by my new process and as the recovery of silver from low grade silver ore is of prime importance, I shall describe the same by way of example, in connection with low grade silver ore.

In the operation of my new invention I treat the finely divided ore in the well known manner with a solution containing from 0.001 to 0.5, eventually exceeding even 1% of cyanide of sodium, potassium, calcium, barium, etc. and as soon as the said cyanide solution, preferably that of sodium cyanide, has been enriched enough with silver, it is passed through a filtering device; to the clear filtrate of the double salt of sodium silver cyanide I add then the theoretical amount of dissolved sodium sulfide, $Na_2S$, to precipitate the silver and the other metals in the form of their sulfides from the solution of the double salt just referred to. I have found that the precipitation of the sulfides goes quicker if the cyanide solution is slightly heated to for instance a lukewarm temperature. The obtained sulfides are separated from the cyanide solution by filtering.

The fact that silver can be precipitated in the form of its sulfide from a silver sodium cyanide solution is known per se, but it is important for the economical recovery of silver that only a predetermined quantity of sodium sulfide, in the form of its aqueous solution, is added to the solution of the double salt as corresponds to the amount of silver and other metals contained in the solution which amount must be carefully determined by analysis. As I thus avoid any excess of sodium sulfide the double decomposition produces therefore in the filtrate of the double salt unsoluble $Ag_2S$ and $2NaCN$ and it is evident that the full amount of cyanogen, bound to the dissolved metals, is recovered and that I may use it over again in the process as the recovered sodium cyanide solution is devoid of $Na_2S$.

The sulfides are filtered off from the cyanide solution and are amply washed and are then acted upon at elevated temperature, preferably at the boiling point, with a 28% nitric acid until nitrous gases are generated. By this action all the sulfides of the metals other than gold and silver are entirely dissolved, some $Ag_2SO_4$ being also formed. This boiling of the silver, however, causes the surprising phenomenon, of changing the black color of the silver sulfide precipitate into a purple color and causing the heavy sulfide to settle very quickly in the hot nitric acid solution. As soon as this settling is effected the clear solution over the purple precipitate is separated by decanting the same into a well agitated solution of sodium chloride of about 10% strength. Any amount of silver which has dissolved as $Ag_2SO_4$ in the hot nitric acid is by means of the sodium chloride precipitated in the form of AgCl which is filtered off, washed and dried.

The residue of purple silver sulfide is also filtered off and washed repeatedly with boiling water, the filtrate being added to the sodium chloride solution; the cake of silver sulfide is then dried, mixed with the aforesaid silver chloride and the mixture thus obtained is finally embodied into a mixture of 6 parts of dry sodium carbonate and part of sodium nitrate, which mixture is then put into a Hessian crucible and reduced by heating to the metallic state; as soon as a regulus is obtained it is poured into an agitated bath of cold water whereby granules of metallic silver, displaying a high lustre, are obtained.

The sodium chloride solution referred to above can be used for several operations which of course enriches the amount of nitric acid therein so as to gradually transform the sodium chloride into sodium nitrate, some sodium sulfate being also formed by double decomposition between the silver sulfate and the sodium chloride. Whenever the salts have sufficiently enriched in the sodium chloride solution they are separated therefrom by fractional crystallization and the recovered sodium nitrate may be used in the reduction of the dry purple silver sulfide. The sodium cyanide solution containing the regenerated sodium cyanide must be tested thoroughly for the presence of sodium sulfide, and of silver, before it is taken over again in the process.

After a long line of vain experiments to effectively and economically separate the sulfides of the other metals from that of silver, I am convinced that the formation of the intermediate purple silver sulfide is an essential factor in my new process for I have found that the purple color of the silver sulfide indicates its freedom from the sulfides of the other metals and thus the transformation of the black silver sulfide by heating it with a 28% nitric acid into the purple modification, about which I could find no information in the literature, admits of a thorough separation of the accompanying sulfides of other metals from that of silver.

Finally I wish to state that my new process can be applied as well to high grade silver ores and that therefore the concentration of the sodium cyanide solution as well as that of the applied sodium sulfide solution may vary within wide limits; the concentration of the sodium cyanide solution may even exceed considerably 1% strength; furthermore my new process may also be applied for recovering silver from the cyanide solutions, containing the same, as are used in the plating of other metals.

Whenever I speak in the following claims of an "alkali" metal I mean to include an earth alkali metal as well and though the sulfides mentioned above are obtained by precipitation from a metal cyanide solution, it is of course understood that the sulfides may just as well be precipitated from any other metal solution obtained by leaching a silver ore with another solvent than a cyanide solution.

What I claim is:

1. The process of extracting silver from a mixture of sulfides precipitated from a solution obtained by leaching silver ores, said process comprising acting on the sulfides with nitric acid at an elevated temperature thereby entirely dissolving the sulfides other than that of silver and some of silver sulfide, separating the undissolved silver sulfide from the hot nitric acid solution, acting with the separated hot nitric acid solution on an alkali metal chloride solution thereby precipitating the dissolved silver sulfate in the form of silver chloride, separating the silver chloride from the alkali metal chloride solution, combining the silver chloride with the silver sulfide, and reducing the silver from the mixture of the silver chloride and silver sulfide in any of the well known ways.

2. The process of extracting silver from a mixture of sulfides precipitated from a solution obtained by leaching a silver ore, said process comprising acting on the sulfides with nitric acid at an elevated temperature thereby entirely dissolving the sulfides other than that of silver and some silver sulfide, separating the silver sulfide from the hot nitric acid solution, acting with the separated hot nitric acid solution on a sodium chloride solution precipitating thereby the dissolved silver sulfate in the form of silver chloride, separating the silver chloride from the sodium chloride solution, combining the silver chloride with the silver sulfide, and reducing the silver from the mixture of the silver chloride and silver sulfide in any of the well known ways.

3. The process of extracting silver from a mixture of sulfides precipitated from a solution obtained by leaching a silver ore, said process comprising acting on the sulfides with boiling nitric acid until nitrous gases are formed thereby entirely dissolving the sulfides other than that of silver and some silver sulfide and changing the black color of the silver sulfide into a purple color, separating the silver sulfide from the hot nitric acid solution, acting with the separated hot nitric acid solution on an alkali metal chloride solution thereby precipitating the dissolved silver sulfate in the form of silver chloride, combining the silver chloride with the silver sulfide, and reducing the metal from the mixture of the silver chloride and silver sulfide in any of the well known ways.

4. The process of extracting silver from a mixture of sulfides precipitated from a solution obtained by leaching a silver ore, said process comprising acting on the sulfides with boiling nitric acid containing substantially 28% $HNO_3$ until nitrous gases are formed and the black color of the silver sulfide changes to a purple color.

FRIEDRICH W. WEBER.